US011912224B2

(12) United States Patent
Ono

(10) Patent No.: US 11,912,224 B2
(45) Date of Patent: Feb. 27, 2024

(54) KNEE PROTECTION AIRBAG DEVICE

(71) Applicant: TOYODA GOSEI CO., LTD., Kiyosu (JP)

(72) Inventor: Minoru Ono, Aichi-ken (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

(21) Appl. No.: 18/308,052

(22) Filed: Apr. 27, 2023

(65) Prior Publication Data
US 2023/0365092 A1 Nov. 16, 2023

(30) Foreign Application Priority Data

May 12, 2022 (JP) .................................. 2022-078877

(51) Int. Cl.
| | |
|---|---|
| *B60R 21/206* | (2011.01) |
| *B60R 21/2165* | (2011.01) |
| *B60R 21/217* | (2011.01) |
| *B60R 21/237* | (2006.01) |
| *B60R 21/231* | (2011.01) |

(52) U.S. Cl.
CPC .......... *B60R 21/206* (2013.01); *B60R 21/217* (2013.01); *B60R 21/2165* (2013.01); *B60R 21/237* (2013.01); *B60R 2021/23169* (2013.01)

(58) Field of Classification Search
CPC .................................................. B60R 21/206
See application file for complete search history.

(56) References Cited

U.S. PATENT DOCUMENTS

| | | | | |
|---|---|---|---|---|
| 2010/0078923 | A1* | 4/2010 | Suzuki | B60R 21/206 |
| | | | | 280/743.1 |
| 2016/0288757 | A1* | 10/2016 | Ando | B60R 21/2338 |
| 2016/0288758 | A1* | 10/2016 | Ando | B60R 21/206 |
| 2018/0065586 | A1* | 3/2018 | Takebayashi | B60R 21/2165 |
| 2019/0202392 | A1* | 7/2019 | Ono | B60R 21/206 |
| 2021/0300288 | A1 | 9/2021 | Ono et al. | |

FOREIGN PATENT DOCUMENTS

| | | | | | |
|---|---|---|---|---|---|
| JP | 2005271703 | A | * | 10/2005 | ........... B60R 21/203 |
| JP | 2020-040505 | A | | 3/2020 | |
| JP | 2020040505 | A | * | 3/2020 | |
| JP | 2021-155018 | A | | 10/2021 | |
| JP | 2021154941 | A | * | 10/2021 | |
| JP | 7106800 | B2 | * | 7/2022 | |

* cited by examiner

*Primary Examiner* — Nicole T Verley

(74) *Attorney, Agent, or Firm* — POSZ LAW GROUP, PLC

(57) ABSTRACT

A knee protection airbag device includes an airbag, an inflator, an airbag cover, and an attachment base which holds those and is to be attached to a vehicle body member. The attachment base includes a holding seat which is disposed in front of a body portion of the inflator and a folded portion of the airbag, and holds the body portion and the airbag attached by a fastening bolt of the inflator, and attachment seats which are arranged on left and right sides of the holding seat and are attached to the vehicle body member. The airbag cover covers a vicinity of the airbag folded and the body portion of the inflator on a rear side of the attachment base, is attached to the attachment base due to the fastening bolt being fastened, and provides a projection opening on a bottom side of the airbag cover.

4 Claims, 12 Drawing Sheets

KNEE PROTECTION AIRBAG DEVICE

CROSS-REFERENCE TO RELATED APPLICATIONS

This application claims priority from Japanese Patent Application No. 2022-078877 filed on May 12, 2022, the entire subject-matter of which is incorporated herein by reference.

TECHNICAL FIELD

The present disclosure relates to a knee protection airbag device mounted on a lower front side of a seat in a vehicle.

BACKGROUND ART

The airbag device for knee protection in the related art includes an airbag for knee protection, which is to be folded and accommodated, an inflator that supplies inflation gas to the airbag, an airbag cover that cover the airbag which is folded and accommodated, in which the airbag cover is pushed by the airbag being inflated to form a projection opening through which the airbag projects, and an attachment base that holds the airbag, the inflator, and the airbag cover, and is to be attached to a vehicle body member (see JP2021-155018A, for example). The airbag device is a so-called "bottom type" in which the airbag device is mounted on a front lower side of a seat and is configured such that the airbag being inflated projects downward from a mounted portion of the airbag folded and subsequently deploys rearward and upward. The inflator of the airbag device includes a body portion accommodated in the airbag, and a fastening bolt projecting outside the airbag from the body portion and fastened to the attachment base. The airbag includes a base portion that accommodates the body portion of the inflator and is attached to the attachment base together with the body portion of the inflator due to the fastening bolt being fastened, a reversing portion that extends downward from the base portion and reverses upward during the inflation of the airbag, and an inflation body portion that is inflated to expand upward from the reversing portion. The airbag is folded such that an upper edge of the inflation body portion approaches a base portion, and is accommodated in an airbag cover with a substantially rectangular cylinder shape. The airbag cover is composed of a sheet material made of non-woven fabric, and is formed into a substantially rectangular cylindrical shape by pressing the sheet material. The airbag cover is configured to cover a vicinity of the airbag folded and the body portion of the inflator, be attached to the attachment base arranged above the airbag cover due to the fastening bolt passing through the airbag cover, and provide the projection opening on a bottom side. The attachment base includes a holding seat with a fastening hole that allows the fastening bolt of the inflator to pass through near a center in a left-right direction, and includes attachment seats, on both left and right side of the holding seat, that are attached to the vehicle body member using attachment bolts or the like.

As another airbag device for knee protection, there is one in which an attachment base is arranged on a front side, a fastening bolt of an inflator of which a body portion is accommodated in an airbag is passed through the attachment base and a vehicle body member, and the airbag and the inflator are attached to the attachment base which is placed on the front side (see JP2020-040505A, for example).

However, in the knee protection airbag device of the related art described in JP2021-155018A, the fastening bolt of the inflator is passed through from a bottom to a top of the attachment base arranged above and fastened, and the attachment seats provided on both left and right sides of the holding seat of the attachment base arranged on a top side of the airbag device are attached to the vehicle body member arranged above by using the attachment bolts with axial directions parallel to an up-down direction. That is, in the knee protection airbag device described in JP2021-155018A, when the airbag device is mounted on a vehicle, a work space is required above the mounted portion for turning the nuts or the like. Therefore, when mounting such airbag device on the vehicle, it is difficult to secure a work space for turning the nuts or the like, in a vehicle that does not have space above the mounted portion.

On the other hand, in the knee protection airbag device of the related art described in JP2020-040505A, it is configured to be attached to a vehicle body member using the fastening bolt of the inflator, and when mounting the airbag device on a vehicle, even when there is no space above the mounted portion, the airbag device can be attached to the vehicle body member if there is a work space on a front, rear, left, or right side of the mounted portion. However, in such airbag device, since a folded portion of the folded airbag is arranged behind the body portion of the inflator, the airbag tends to project rearward during the inflation. Therefore, it is difficult to adopt a bottom type airbag device in which an airbag being inflated properly projects downward from the mounted portion and subsequently deploys rearward and upward.

SUMMARY OF INVENTION

An object of the present disclosure is to provide a knee protection airbag device which facilitates mounting work on a vehicle and easily secures a behavior of deploying rearwardly upward after an airbag being inflated properly projects downward from a mounted portion of the airbag folded.

The present disclosure relates to a knee protection airbag device has:
- an airbag for knee protection, which is to be folded and accommodated;
- an inflator that supplies inflation gas to the airbag;
- an airbag cover that covers the airbag which is folded and accommodated, in which the airbag cover is pushed by the airbag being inflated to form a projection opening through which the airbag projects; and
- an attachment base that holds the airbag, the inflator, and the airbag cover, and is to be attached to a vehicle body member,
- in which the knee protection airbag device is mounted on a front lower side of a seat, and the airbag being inflated projects downward from a mounted portion of the airbag folded and subsequently deploys rearward and upward,
- the inflator includes a body portion accommodated in the airbag, and a fastening bolt projecting outside the airbag from the body portion and fastened to the attachment base,
- the airbag includes:
  - a base portion that accommodates the body portion of the inflator and is attached to the attachment base together with the body portion of the inflator due to the fastening bolt being fastened;

a reversing portion that extends downward from the base portion and reverses upward during the inflation of the airbag; and an inflation body portion that is inflated to expand upward from the reversing portion, the airbag is accommodated at the mounted portion to dispose a folded portion, which is folded such that an upper edge of the inflation body portion approaches the base portion, below the body portion of the inflator, the attachment base includes:

a holding seat that is disposed in front of the body portion of the inflator and the folded portion of the airbag when mounted on a vehicle, and holds the body portion and the airbag attached by the fastening bolt being fastened; and attachment seats that are arranged on left and right sides of the holding seat and are attached to the vehicle body member using attachment bolts of which axial directions are parallel to a front-rear direction, the attachment base is configured to have a substantially flat plate shape extending in a left-right direction, and the airbag cover is configured to cover a vicinity of the airbag folded and the body portion of the inflator on a rear side of the attachment base, be attached to the attachment base due to the fastening bolt passing through the airbag cover, and provide the projection opening on a bottom side.

In the knee protection airbag device according to the present disclosure, the inflator, the airbag, and the airbag cover are attached to the holding seat of the attachment base using the fastening bolt of the inflator to assemble the airbag device, and then the airbag device can be mounted on the vehicle by placing the attachment seat of the attachment base on the vehicle body member and using the attachment bolts. In areas on front, rear, left, and right side of the mounted portion, unlike an area above the mounted portion, there are fewer various vehicle-mounted parts instead of those in the instrument panel in front of the seat, and it becomes easier to secure a work space. Therefore, the mounting work can be easily carried out together with a fact that a bottom type knee protection airbag device is used, which makes it easy for hands or the like to enter from a floor side.

The folded portion of the airbag is arranged below the body portion of the inflator, and during operation, the folded portion is smoothly pushed downward by the inflation gas discharged from the body portion, and thus the projection opening can be formed in the airbag cover by pushing a bottom surface side of the airbag cover open. Therefore, during operation, the folded airbag properly projects downward from the mounted portion, and subsequently deploys rearward and upward by the reversing portion. Then, the airbag inflates the inflation body portion to complete the inflation. Here, the attachment base is arranged to cover a portion from the base portion covering the body portion of the inflator to a front side of the folded portion in a vicinity of the base portion. When the airbag completes inflation, a rear surface side of the attachment base supports the airbag from a vicinity of the base portion of the airbag to the reversing portion of the vicinity of the base portion to secure a reaction force. Therefore, rotational behavior such as lowering of the inflation body portion can be prevented, and the airbag can accurately complete inflation while protecting knees.

Therefore, the knee protection airbag device of the present disclosure can be easily mounted on the vehicle, and can ensure a behavior that the airbag being inflated properly projects downward from the mounted portion and subsequently deploys rearward and upward. The inflation body portion of the airbag at the completion of inflation can also be arranged at a precise height position.

In the knee protection airbag device, the attachment base may be configured such that an arrangement position of the fastening bolt on the holding seat and arrangement positions of the attachment bolts on the attachment seat correspond to each other in height over the left-right direction.

In such a configuration, even when the inflation gas is discharged from the body portion of the inflator, an attachment position of the attachment base to the vehicle body member using the attachment bolts and a holding position of the body portion of the inflator using the fastening bolt correspond to each other in height over the left-right direction, and it is difficult for the attachment base to rotate back and forth around the attachment position, and thus a downward projection direction and the like of the airbag can be stabilized. Therefore, an expansion behavior of the airbag can be further stabilized. By the way, for example, when an attachment position of the attachment base to the vehicle body member is higher than the holding position of the body portion of the inflator, with the attachment position as a fulcrum, a reaction force of the inflation gas discharged from the body portion of the inflator makes it easier for a vicinity of the arrangement position of the fastening bolt of the inflator on the holding seat below the attachment position to rotate forward. On the other hand, when the holding seat deforms to rotate forward, the reversing portion of the airbag and the inflation body portion will shift downward, making it difficult to position the inflation body portion accurately.

In the knee protection airbag device, the attachment base may be made of a metal plate, and may be configured to be of a substantially flat plate-shape and may have reinforcing ribs which project from upper and lower edges.

With such a configuration, even when the attachment base is in the shape of a substantially flat plate, it is less likely to undergo bending deformation and can stably support the airbag being inflated. Even when the attachment base is made of the metal plate, the attachment base can be lightened because the attachment base has a substantially flat plate shape extending in the left-right direction.

DESCRIPTION OF EMBODIMENTS

Figure 1:
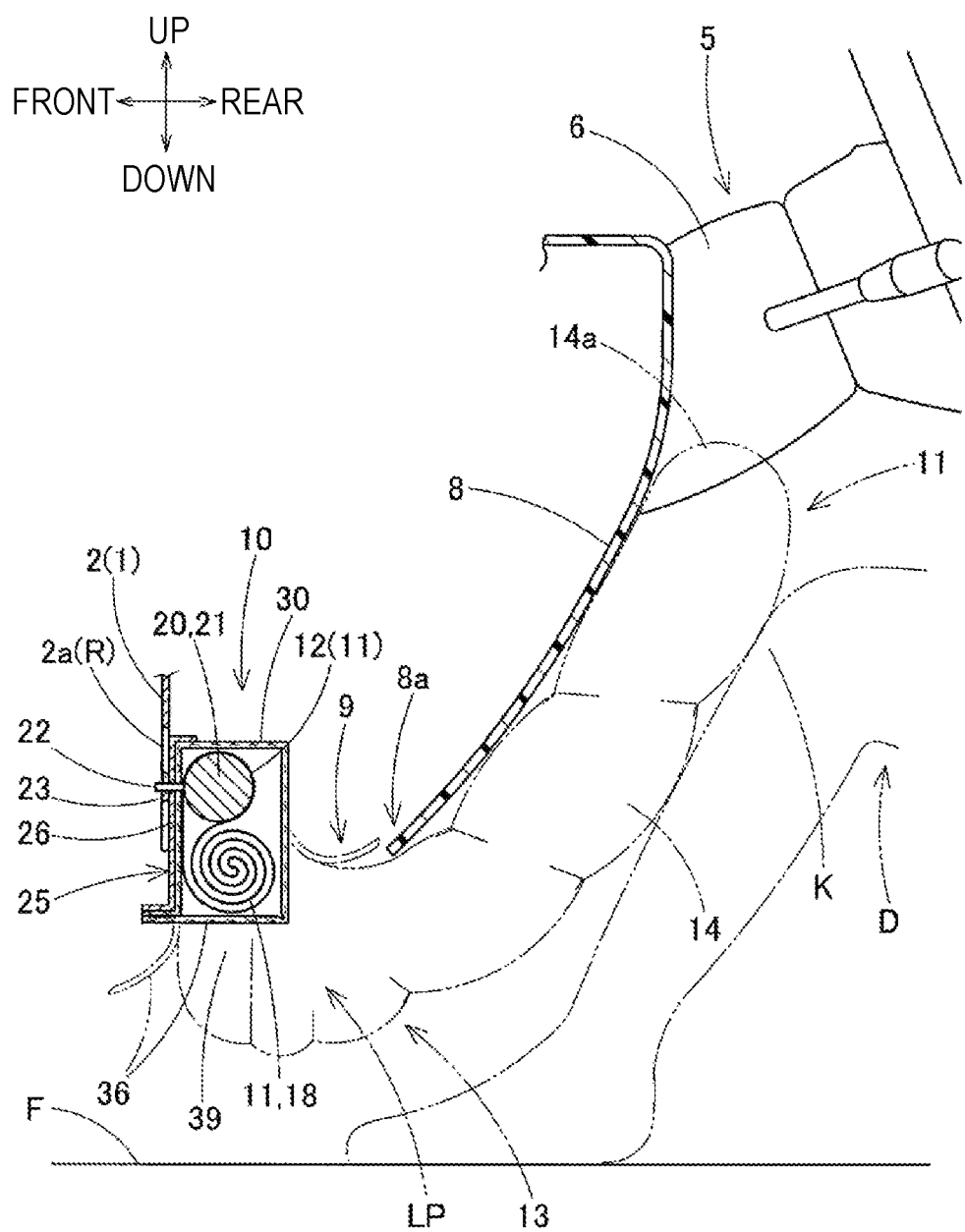
FIG. 1 is a schematic vertical cross-sectional view illustrating a state in which a knee protection airbag device according to an embodiment of the present disclosure is mounted on a vehicle.
Figure 2:
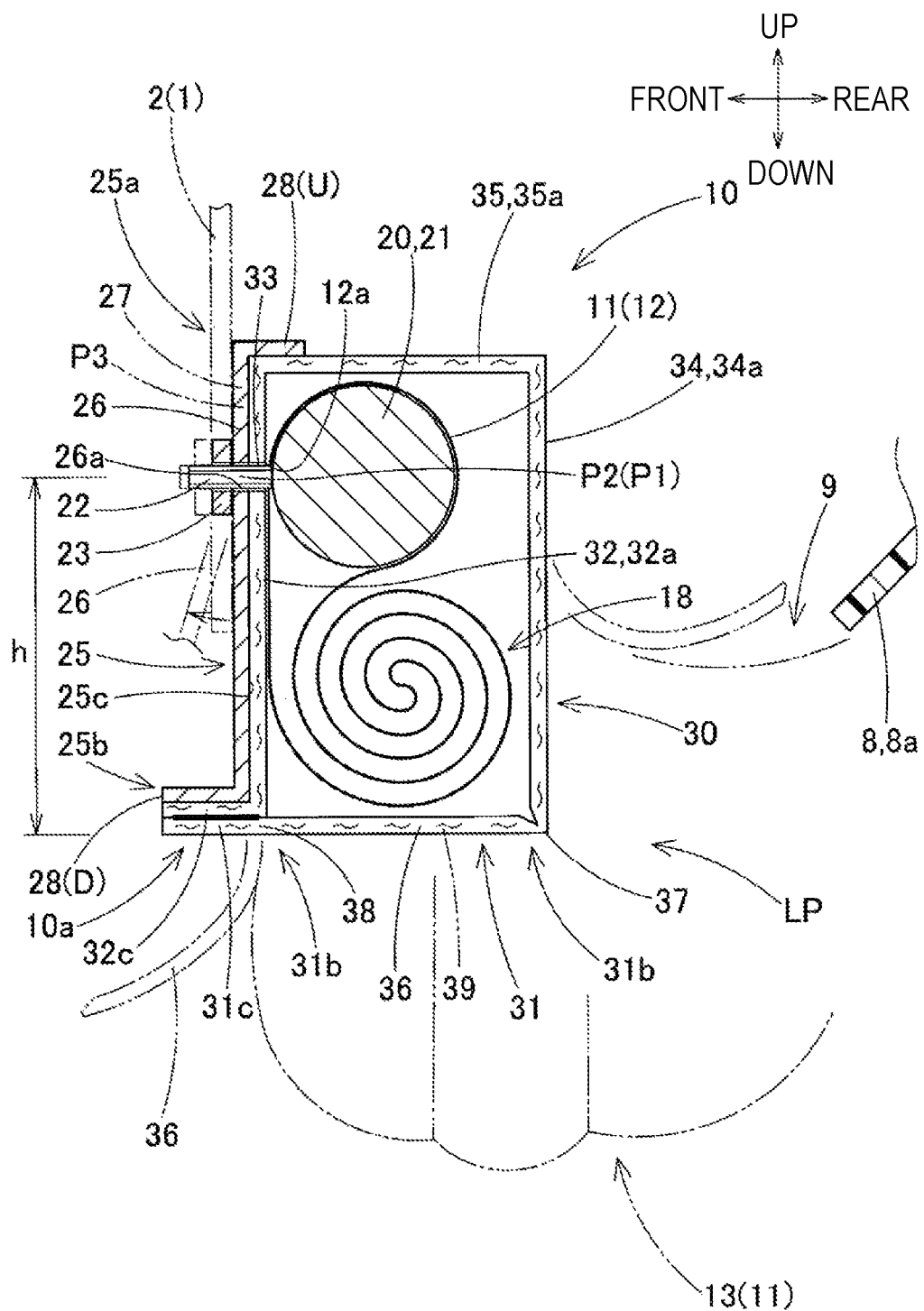
FIG. 2 is a schematic enlarged vertical cross-sectional view of a vicinity of a fastening bolt when the airbag device of the embodiment is mounted on the vehicle.
Figure 3:
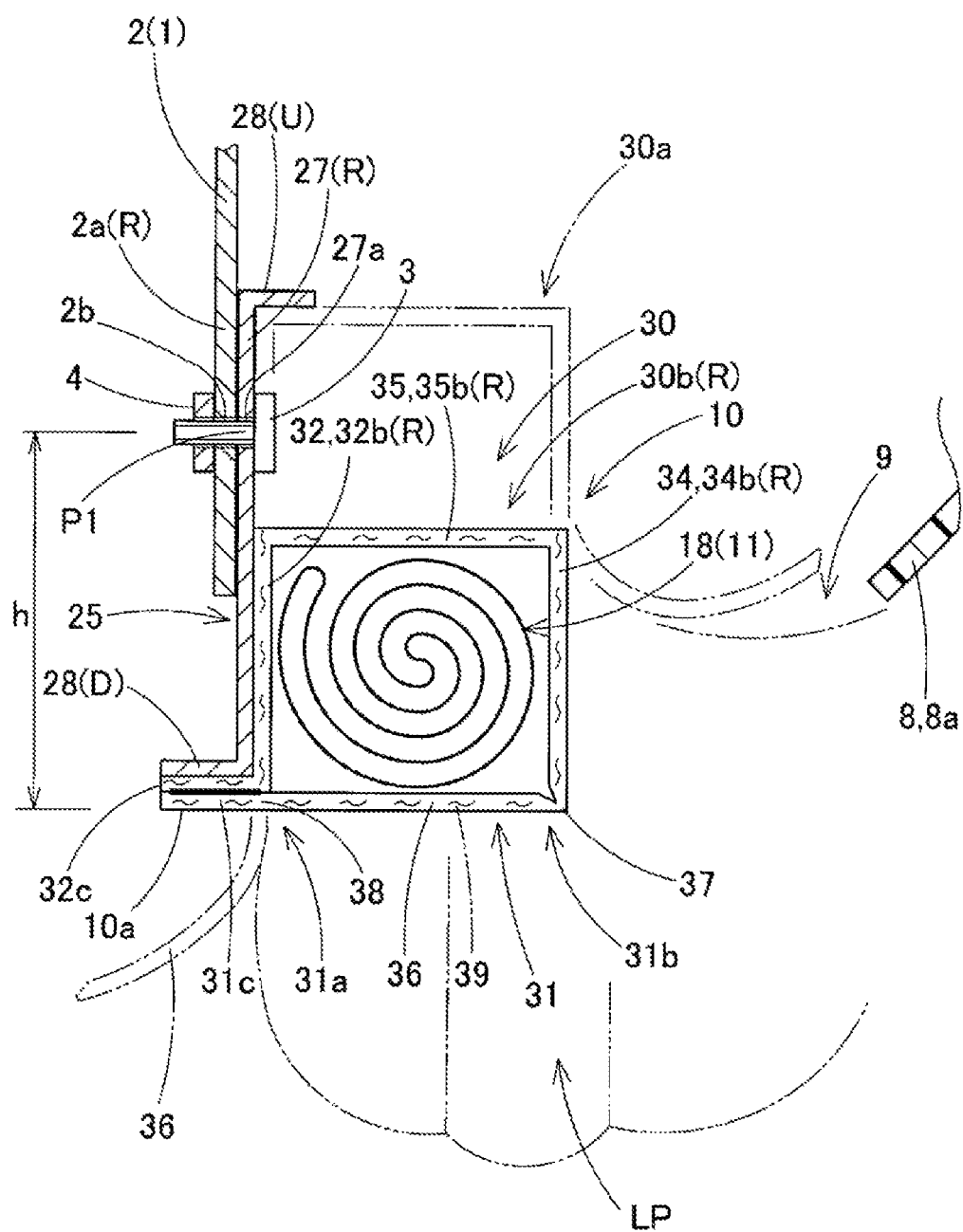
FIG. 3 is a schematic enlarged vertical cross-sectional view of a vicinity of an attachment bolt when the airbag device of the embodiment is mounted on the vehicle.
Figure 4:
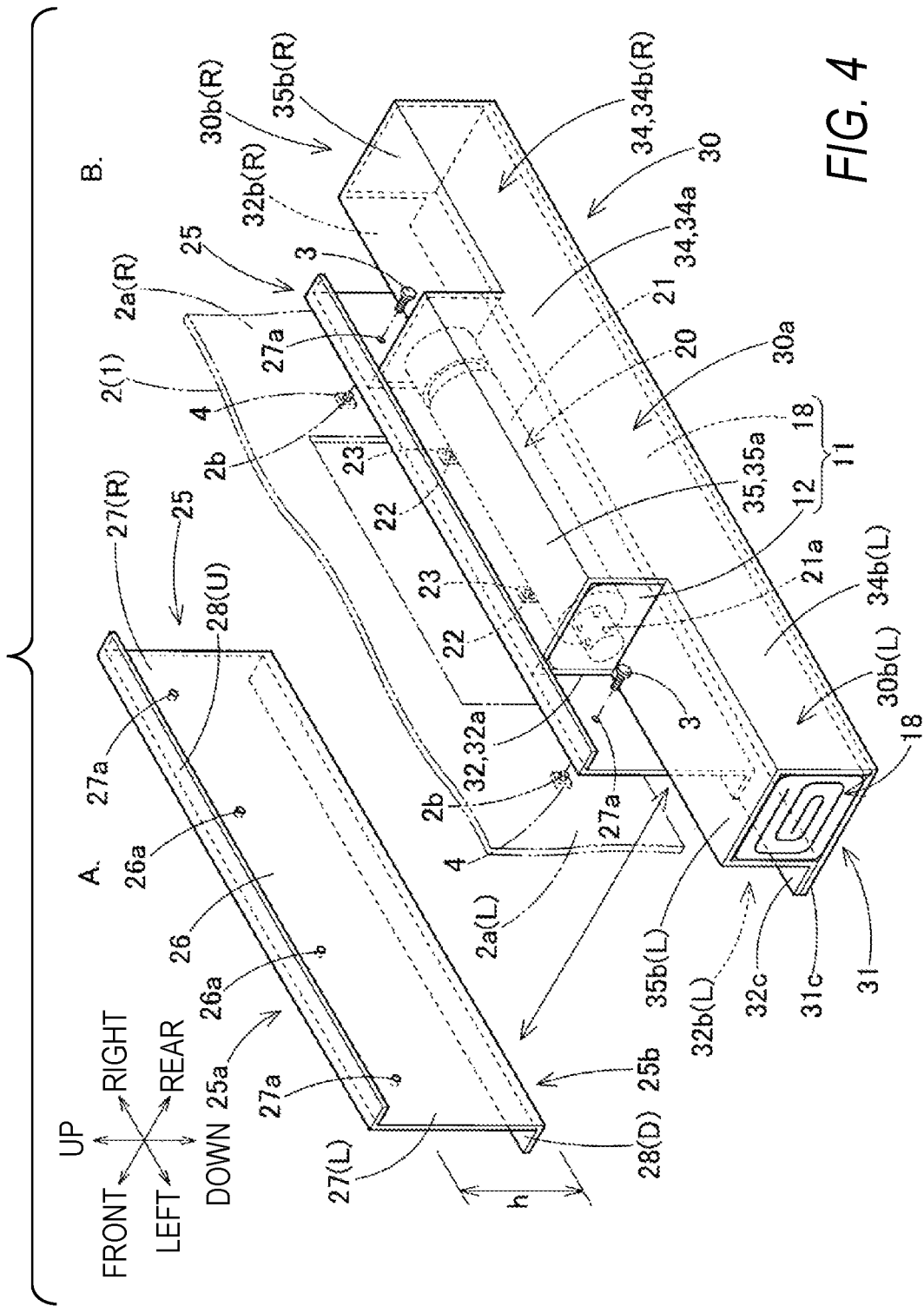
FIG. 4 is a schematic perspective view of the airbag device of the embodiment.
Figure 8:
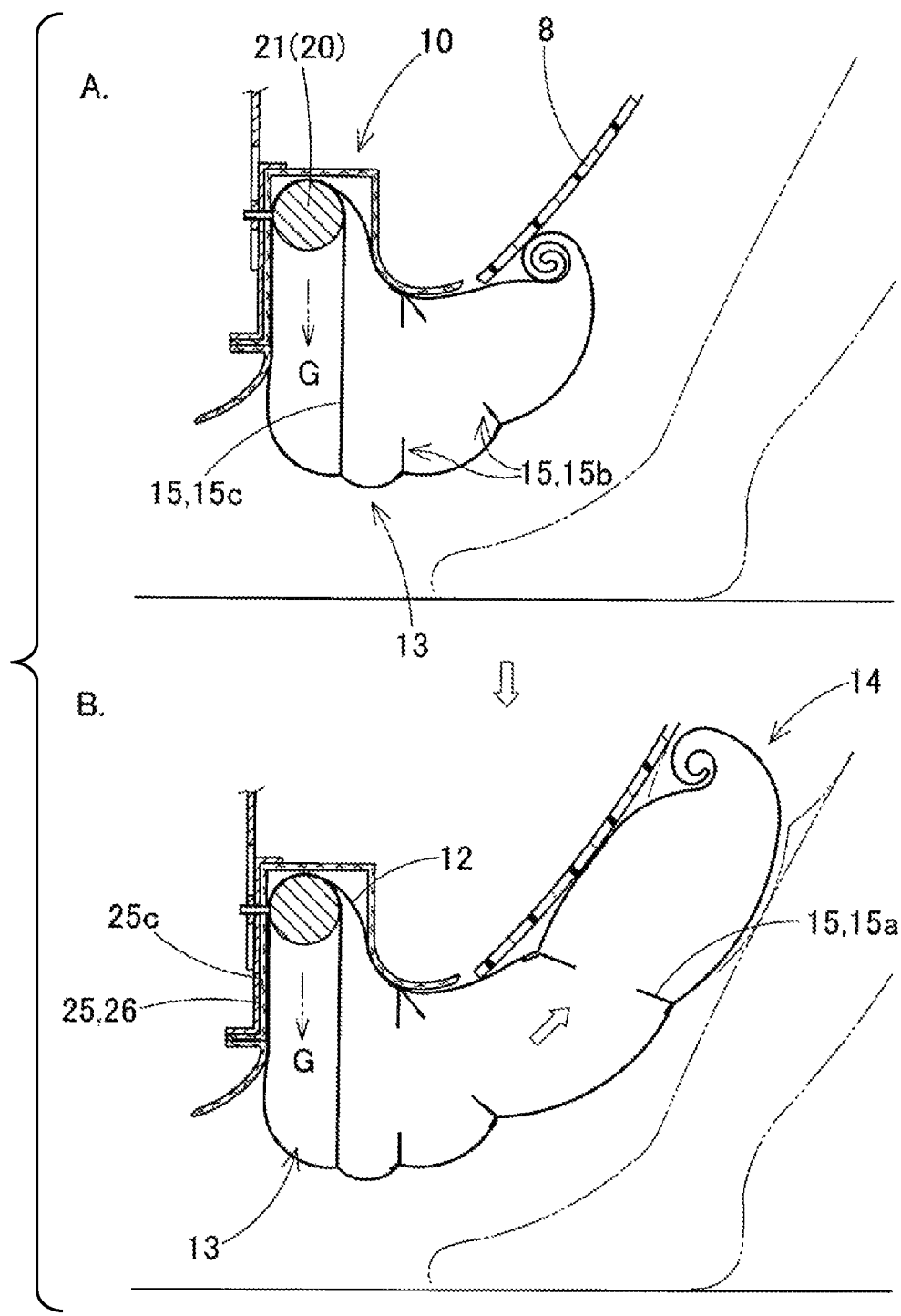
FIG. 8 is schematic longitudinal cross-sectional views sequentially illustrating an operating state of the knee protection airbag device of the embodiment and illustrate a state after FIG. 7.

When a knee protection airbag device according to an embodiment of the present disclosure will be described below with reference to the drawings, as illustrated in FIGS. 1 and 8, a knee protection airbag device 10 of the embodiment is mounted on a lower front side of driver's seat, specifically, a lower side of a instrument panel 8 on a front side, more specifically, an opening 9 on a lower edge 8a side of the instrument panel 8 below a column cover 6 of a steering column 5 as a mounted portion LP.

In the specification, front-rear, up-down, and left-right directions correspond to directions in which the airbag device is mounted on the vehicle. As illustrated in FIGS. 1 to 4, a longitudinal direction of a substantially rectangular shape of an attachment base 25 described below is defined as the left-right direction, a width direction is defined as the up-down direction, and a thickness direction is defined as the front-rear direction.

The airbag device 10 is a so-called "bottom type" knee protection airbag device 10 configured such that an airbag 11, which will be described below, projects downward from the mounted portion LP when being inflated and subsequently deploys rearward and upward (see FIGS. 1 and 7 to 9). The airbag device 10, as illustrated in FIGS. 1 to 4, includes the knee protection airbag 11 that is folded and accommodated, an inflator 20 that supplies inflation gas G (see FIGS. 7 and 8) to the airbag 11, an airbag cover 30 that covers the airbag 11 which is folded and accommodated, in which the airbag cover 30 is pushed by the airbag 11 being inflated to form an opening 39 through which the airbag 11 projects, and the attachment base that holds the airbag 11, the inflator 20, and the airbag cover 30, and is to be attached to a bracket 2 on a body 1 side as a vehicle body member.

The inflator 20 includes a body portion 21 with a substantially cylindrical shape accommodated in the airbag 11, a fastening bolt 22 that protrudes from the body portion 21 and protrudes outside the airbag 11 and is fastened to the attachment base 25. The body portion 21 includes a plurality of gas discharge ports 21a (see FIG. 4) for discharging the inflation gas G provided at a tip end (left end) thereof, and two fastening bolts 22 are provided to project therefrom. Since the inflator 20 is mounted at the mounted portion LP with an axial direction of the main body portion 21 having a substantially cylindrical shape arranged in the left-right direction, the two fastening bolts 22 are arranged side by side in the left-right direction while matching a height direction and protruding forward.

The airbag 11 includes a base portion 12 that accommodates the body portion 21 of the inflator 20, a reversing portion 13 extending downward from the base portion 12 and reversing upward when the inflation of the airbag 11 is completed, and an inflation body portion 14 extending upward from the reversing portion 13 and inflated to protect knees K of a driver D. The airbag 11 has a substantially trapezoidal shape when deployed flat (see FIG. 6). The base portion 12 includes through holes 12a through which the respective fastening bolts 22 pass, and the base portion 12 is attached to the attachment base 25 together with the body portion 21 of the inflator 20 due to the fastening bolt 22 passing through the through hole 12a to the attachment base 25.

Figure 6:
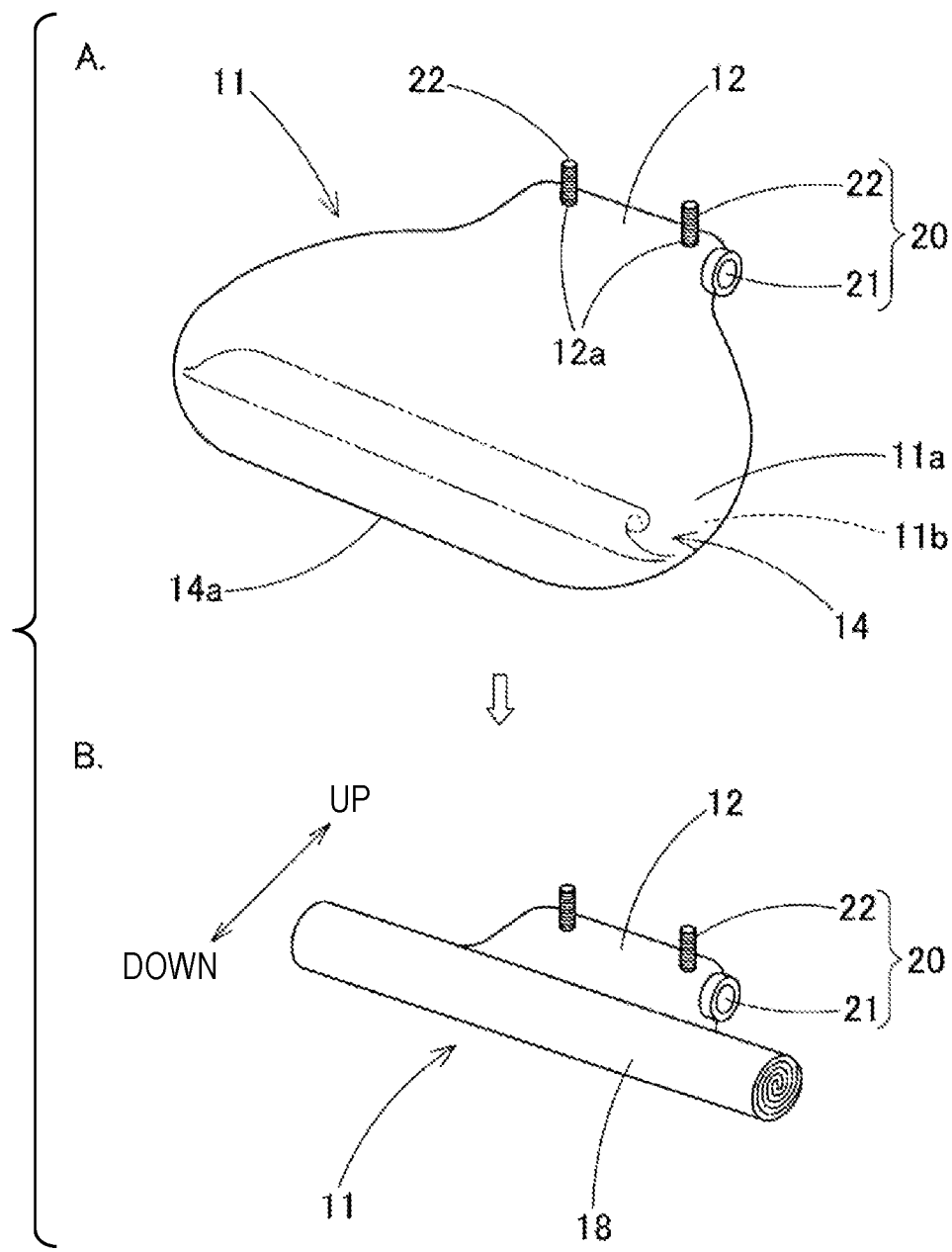
FIG. 6 is views for illustrating a folding process of an airbag of the embodiment.

As illustrated in FIG. 6, the airbag 11 accommodates the body portion 21 of the inflator 20 in the base portion 12 with the fastening bolts 22 protruding from the through holes 12a, and the airbag 11 is then rolled and folded such that a tip end (upper edge) 14a side of the inflation body portion 14 approaches the base portion 12 side in a flatly deployed state. In the case of the embodiment, the airbag 11 is rolled on a side of a vehicle body side wall portion 11a. The airbag 11 is accommodated at the mounted portion LP with a folded portion 18 folded into a roll placed below the body portion 21 of the inflator 20.

Figure 9:
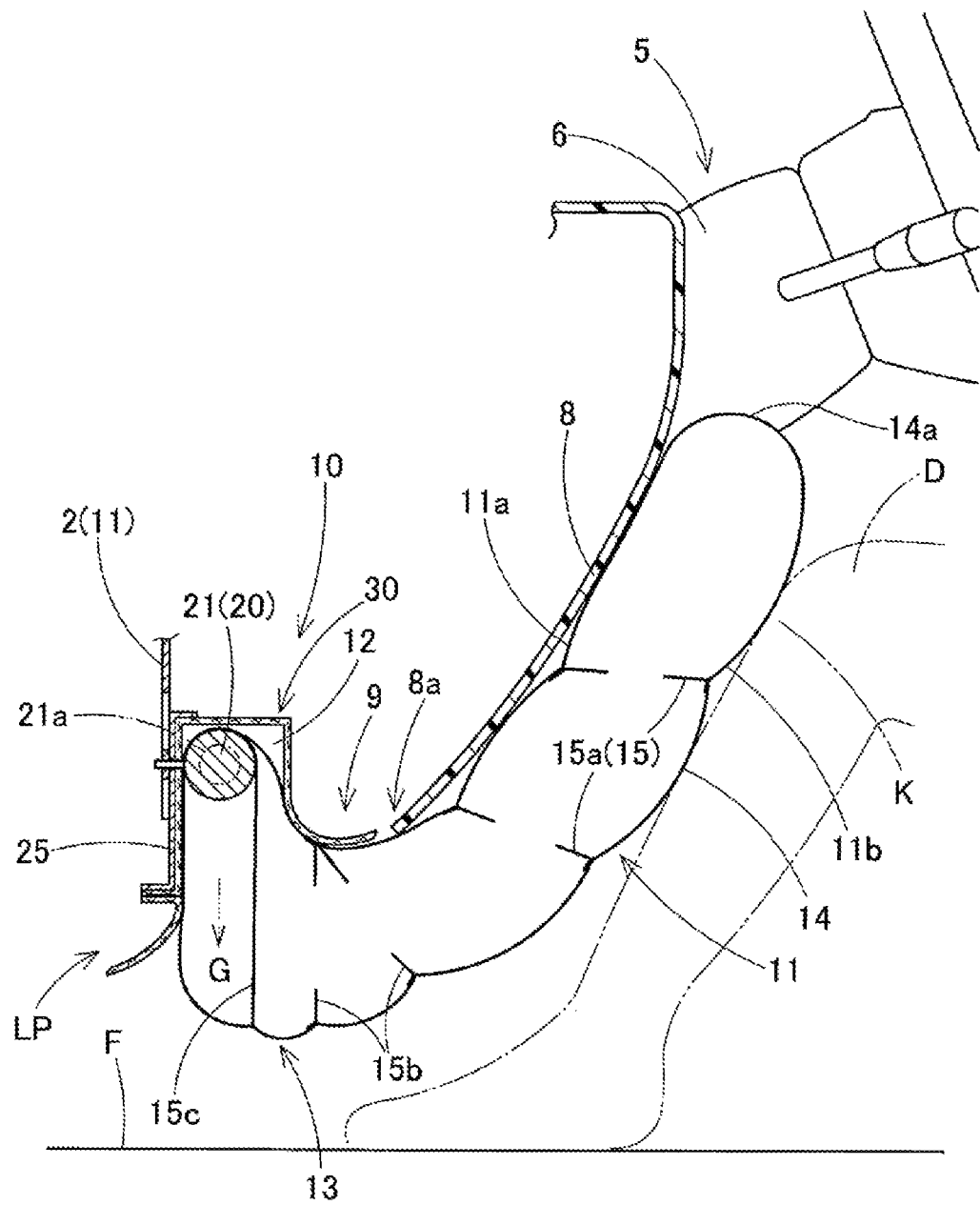
FIG. 9 is a schematic vertical cross-sectional view illustrating a state when an operation of the knee protection airbag device of the embodiment is completed.
Figure 10:
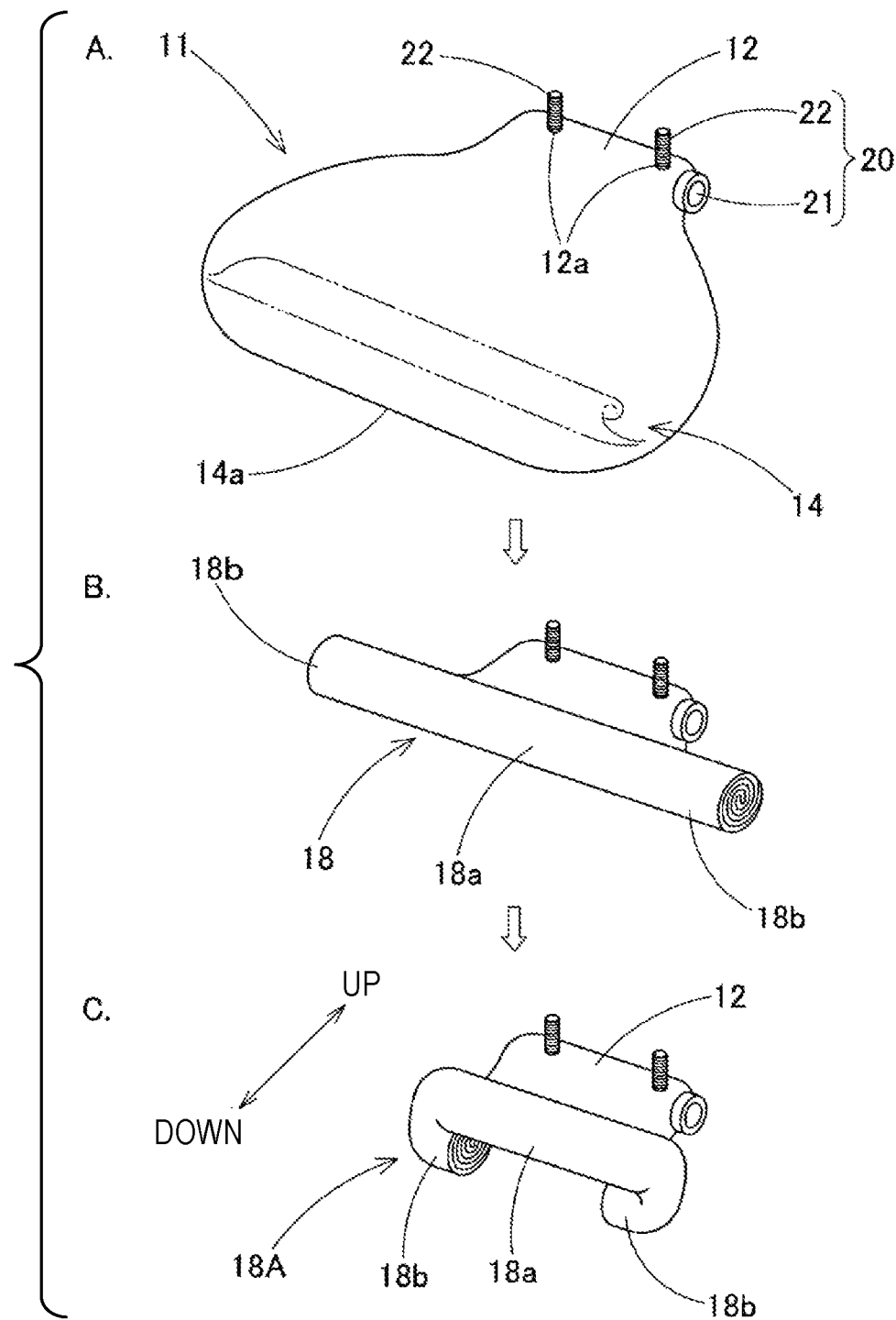
FIG. 10 is views for illustrating a folding process of a modification example of an airbag.
Figure 11:
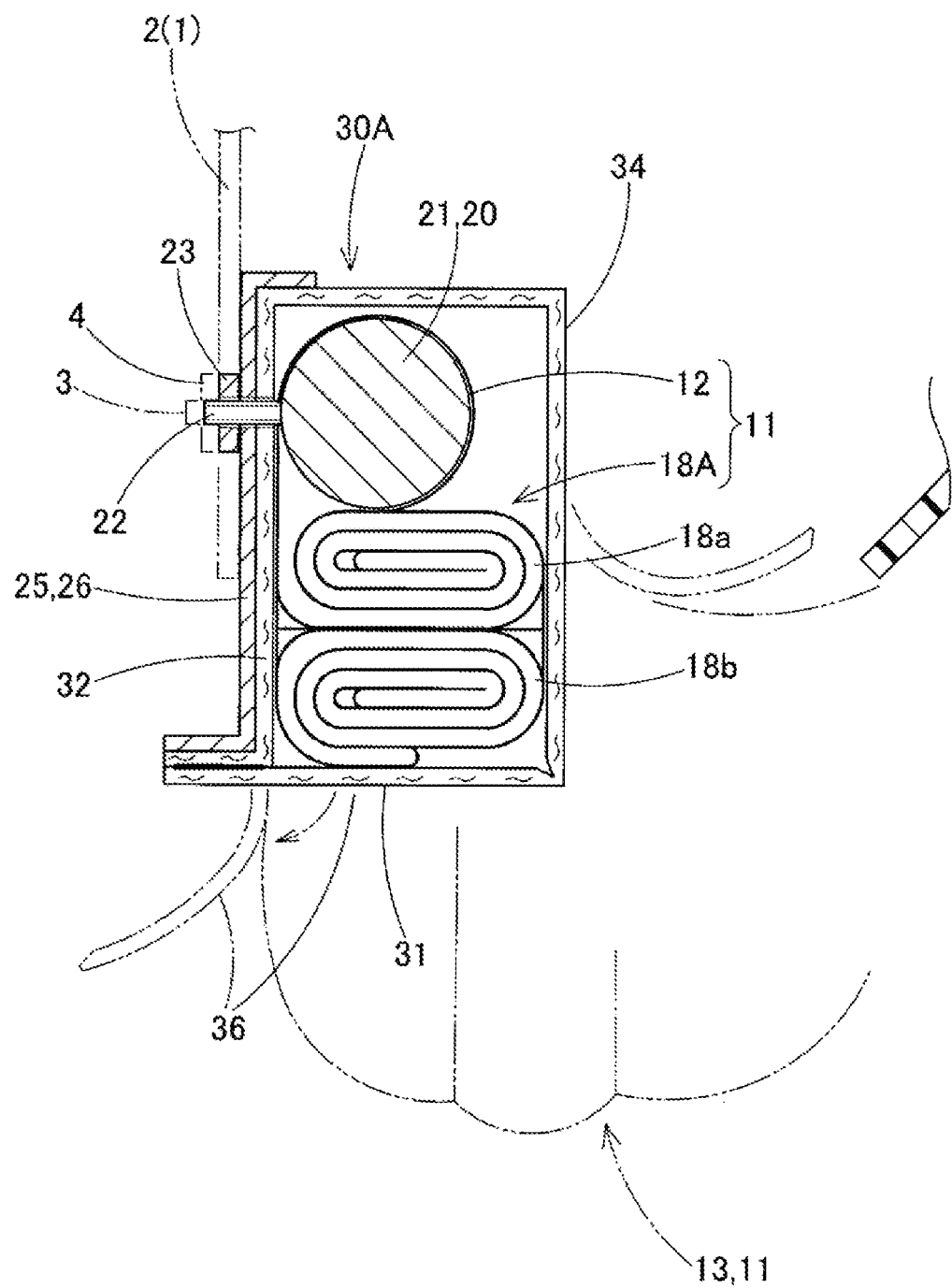
FIG. 11 is a schematic vertical cross-sectional view of the airbag illustrated in FIG. mounted on a vehicle.

The airbag 11 is formed from a woven fabric such as polyester. At the completion of inflation, as illustrated in FIG. 9, the airbag 11 includes the vehicle body side wall portion 11a arranged on the instrument panel 8 side and an occupant side wall portion 11b arranged on the driver D side, and has a substantially trapezoidal shape with a wide tip (upper edge) 14a side. The airbag 11 is internally provided with a plurality of tethers 15 that connect the vehicle body side wall portion 11a and the occupant side wall portion 11b. The tether 15 consists of two thickness regulating tethers 15a and 15a disposed on the inflation body portion 14 side, radial tethers 15b and 15b arranged radially when viewed from the side to form the reversing portion 13, and a traction tether 15c that prevents the reversing portion 13 from falling downward. The radial tethers 15b and 15b are arranged such that the vehicle body side wall portion 11a side is shorter than the occupant side wall portion 11b side as a mutual separation distance, and the radial tethers 15b and 15b are set such that the reversing portion 13 extends downward from the base portion 12 side and subsequently reverses upward. The traction tether 15c is arranged to connect the vehicle body side wall portion 11a near an upper portion of the body portion 21 of the inflator 20 and the occupant side wall portion 11b near a lower portion of the body portion 21. The tethers 15 (15a, 15b, 15c) are arranged to connect the vehicle body side wall portion 11a and the occupant side wall portion 11b by appropriately providing gas flow passages to not block flow of the inflation gas G discharged from a gas discharge port 21a in the body portion 21 of the inflator 20.

The attachment base 25 is made of a metal plate such as an iron plate, and is configured to be of a substantially flat plate shape extending in the left-right direction. The attachment base 25 is arranged in front of the body portion 21 of the inflator 20 and the folded portion 18 of the airbag 11 when mounted on the vehicle. The attachment base 25 holds the body portion 21 and the airbag 11 attached by the fastening bolts 22 being fastened, and attaches the inflator 20 and the airbag 11 to the bracket 2 as a vehicle body member.

The attachment base 25 is formed by pressing a steel plate. The attachment base 25 includes a holding seat 26 arranged in a center in the left-right direction, and attachment seats 27 (L, R) arranged on both left and right sides of the holding seat 26. The holding seat 26 includes fastening holes 26a arranged side by side in the left-right direction, through which the fastening bolts 22 pass. The holding seat 26 holds the body portion 21 of the inflator 20 and the airbag 11 attached by inserting the fastening bolts 22 and 22 into respective fastening holes 26a and fastening nuts 23 to each fastening bolt 22. The left and right attachment seats 27 (L, R) are portions attached to connection seats 2a (L, R) of the bracket 2 as a vehicle body member by using attachment bolts 3 of which axial directions are along the front-rear direction. The attachment seat 27 includes an attachment hole 27a through which the attachment bolts 3 pass.

Each of the connection seats 2a (L, R) of the bracket 2 as the vehicle body member includes the through hole 2b through which the attachment bolt 3 passes, and the nut 4 (weld nut) welded to a front side of the attachment seat 2a for screwing the attachment bolt 3. The connection seats 2a (L, R) are arranged on both left and right sides of the mounted portion LP of the airbag device 10 (see FIGS. 3 and 4). For attachment of the attachment seats 27 (L, R) to the connection seats 2a, the attachment base 25 can be attached to the bracket 2 by arranging the respective attachment seats 27L and 27R on rear surfaces of left and right connection seats 2aL and 2aR, passing the attachment bolts 3 through the attachment hole 27a and the through hole 2b, and fastening each attachment bolt 3 to the nut 4, such that the airbag device 10 can be mounted at the mounted portion LP.

When the airbag device is mounted on the vehicle, the attachment base 25 configured such that height positions h, from a bottom surface 10a of the airbag device 10, of the fastening holes 26a and 26a where the fastening bolts 22 are arranged in the holding seat 26, and the height positions h of the attachment holes 27a where the attachment bolts 3 are arranged in the attachment seats 27 (L, R) correspond to each other over the left-right direction.

Although the attachment base 25 has a substantially rectangular flat plate shape extending in the left-right direction, upper and lower edges 25a and 25b are respectively provided with reinforcing ribs 28 (U, B) having a short projection length. In the case of the embodiment, the reinforcing rib 28U on the upper edge 25a side projects toward a vehicle rear side, and the reinforcing rib 28D on the lower edge 25b side projects toward a vehicle front side.

Figure 5:
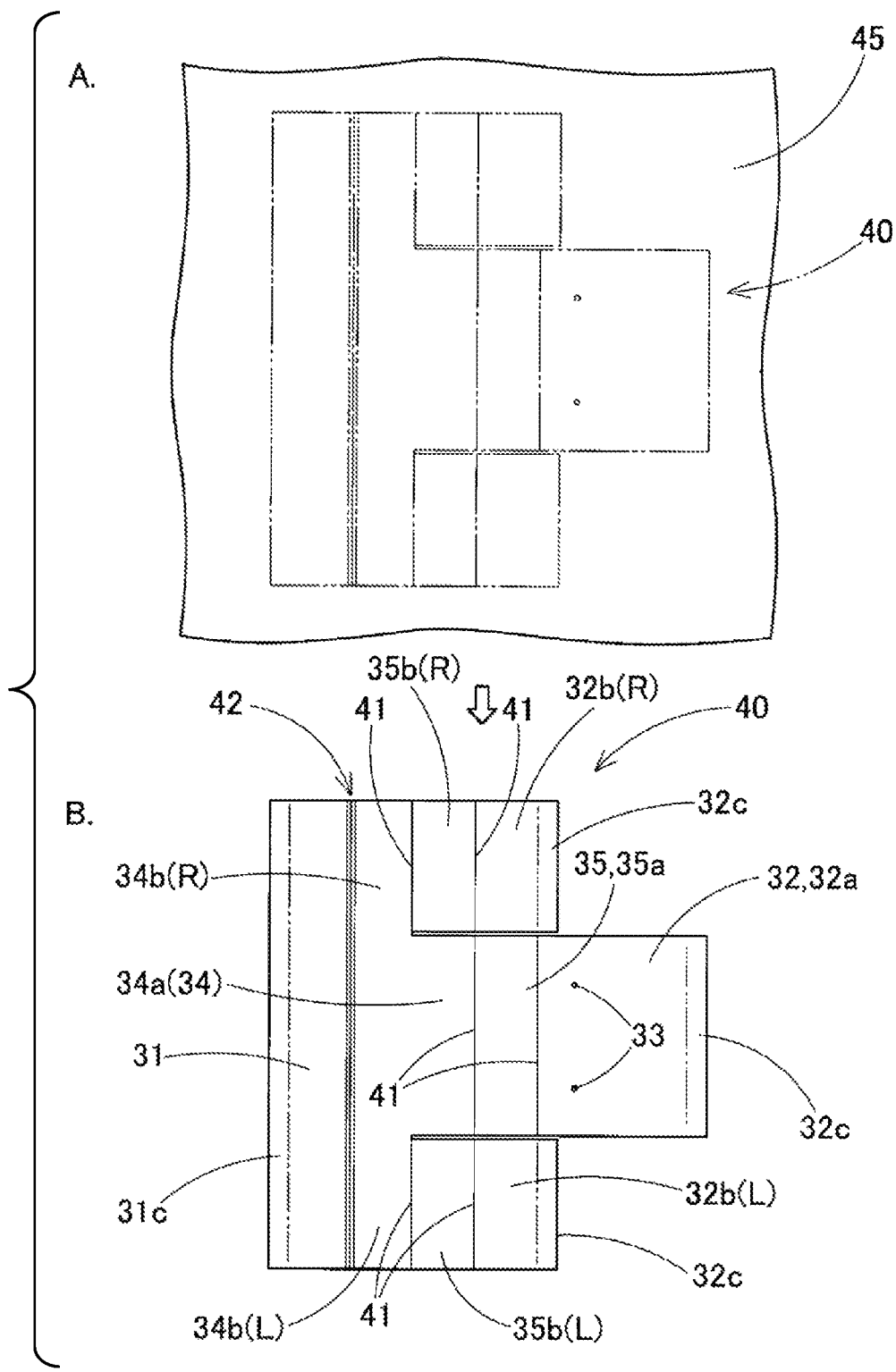
FIG. 5 is exploded views for illustrating an airbag cover of the embodiment.

As illustrated in FIG. 5, the airbag cover 30 is formed from a sheet material 40 cut out from a material for sheet 45 made of nonwoven fabric. The nonwoven fabric of the embodiment is formed by joining or entangling short fibers of polyethylene, polypropylene, polyamide, polyester or the like with an adhesive or low-melting-point fibers.

The airbag cover 30 shares a bottom wall portion 31 having a flat plate shape. The airbag cover 30 includes a central cylindrical portion 30a having a high center height and a substantially rectangular cylindrical shape, and an edge side cylindrical portions 30b (L, R) having a low height and substantially rectangular cylindrical shape. The airbag cover 30 is configured to cover the front, rear, top and bottom of the folded airbag 11 and the body portion 21 of the inflator 20.

The airbag cover 30 includes a bottom wall portion 31 having a substantially rectangular plate shape that covers a lower side of the folded portion 18 of the airbag 11, a front wall portion 32 that extends upward from a front edge 31a side of the bottom wall portion 31 and abuts on a rear surface 25c of the attachment base 25, a rear wall portion 34 extending upward from a rear edge 31b side of the bottom wall portion 31 and arranged to face the front wall portion 32 in the front-rear direction, and a ceiling wall portion 35 covering above the body portion 21 of the inflator 20 and the folded portion 18. The front wall portion 32 includes a center portion 32a having a high height in the center in the left-right direction, and edge portions 32b (L, R) arranged on both left and right sides of the center portion 32a and having a height lower than that of the center portion 32a. Similarly, the rear wall portion 34 includes a center portion 34a having a high height in the center in the left-right direction, and edge portions 34b (L, R) arranged on both left and right sides of the center portion 34a and having a height lower than that of the center portion 34a.

The ceiling wall portion 35 includes a center portion 35a connecting the center portions 32a and 34a of the front wall portion 32 and the rear wall portion 34, and edge portions 35b (L, R) descending from the center portion 35a with steps and connecting the left and right edges 32b (L, R) and 34b (L, R) of the front wall portion 32 and the rear wall portion 34.

In the airbag cover 30, the central cylindrical portion 30a is a portion covering the body portion 21 of the inflator 20 together with the folded portion 18 of the airbag 11, and the edge side cylindrical portions 30b (L, R) are portions separated from an area of the body portion 21 and covering only the folded portion 18 of the airbag 11. The through hole 33 through which the fastening bolt 22 passes is formed in the front wall portion 32 of the central cylindrical portion 30a.

The airbag cover 30 includes the bottom wall portion 31 that defines a door portion 36 that forms a projection opening 39 when the airbag 11 is inflated. The door portion 36 has the front edge 31a side of the bottom wall portion 31 as a hinge portion for opening, and the rear edge 31b side as a breakable portion 37 with a small thickness that is broken when the airbag 11 is inflated.

When the sheet material 40 forming the airbag cover 30 is deployed flat as illustrated in FIG. 5, a part forming the bottom wall portion 31 is connected to parts forming the center portion 34a and the edge portions 34b (L, R) of the rear wall portion 34, a part forming the rear wall portion 34 is connected to parts forming the center portion 35a and the edge portions 35b (L, R) of the ceiling wall portion 35, and a part forming the ceiling wall portion 35 is connected to parts forming the center portion 32a and the edge portions 32b (L, R) of the front wall portion 32. At boundaries of each part, a recessed groove for bending 41 is formed by press working so that creases for bending can be easily made, and a recessed groove for breaking 42 is formed by press working in a portion where a scheduled breakage portion 37 is to be formed to facilitate breaking. Each recessed groove for bending 41 is formed in advance to be easily bent when the airbag device 10 is assembled.

The front edge 31a side of the bottom wall portion 31 and a lower edge side of the front wall portion 32 are provided with joint margins 31c and 32c that are joined to each other by heat sealing or the like. Therefore, when the airbag cover 30 is assembled, each recessed groove for bending 41 of the sheet material 40 is bent to join the joint portions 31c and 32c to form the central cylindrical portion 30a and the edge side cylindrical portion 30b, such that the airbag cover 30 can be assembled.

To describe assembly work of the airbag device 10 of the embodiment, first, the body portion 21 of the inflator 20 is accommodated in the airbag 11 such that the fastening bolt 22 projects, and subsequently as illustrated in FIG. 6, the airbag 11 is folded by rolling such that the upper edge 14a side approaches the base portion 12 to form the folded portion 18. Next, the fastening bolt 22 is passed through the through hole 33 of the front wall portion 32 of the airbag cover 30, and the body portion 21 of the inflator 20 and the folded airbag 11 are arranged on a rear side of the front wall portion 32, and then by bending each recessed groove for bending 41, the ceiling wall portion 35, the front wall portion 32, and the bottom wall portion 31 are arranged around the folded airbag 11 accommodating the body portion 21, and the joint margins 31c and 32c of the bottom wall portion 31 and the front wall portion 32 are overlapped and joined such that the airbag cover 30 can be formed. Next, the respective fastening bolts 22 and 22 are passed through the fastening holes 26a of the holding seat 26 of the attachment base 25, and the nuts 23 are fastened to each fastening bolt 22, such that the body portion 21 of the inflator 20 and the airbag 11 can be attached to the attachment base 25 to assemble the airbag device 10.

After assembling the airbag device 10, an operation signal line (not illustrated) extending from the inflator 20 is connected to a predetermined connector, the attachment seats 27 (L, R) of the attachment base 25 are arranged on the rear surfaces of the left and right connection seats 2a of the bracket 2 as the vehicle body member, and the attachment bolt 3 is passed through the attachment hole 27a and the through hole 2b and the attachment bolt 3 is tightened to the nut 4 such that the attachment base 25 is attached to the bracket 2 on the body 1 side to mount the airbag device 10 at the mounted portion LP of the vehicle.

Figure 7:
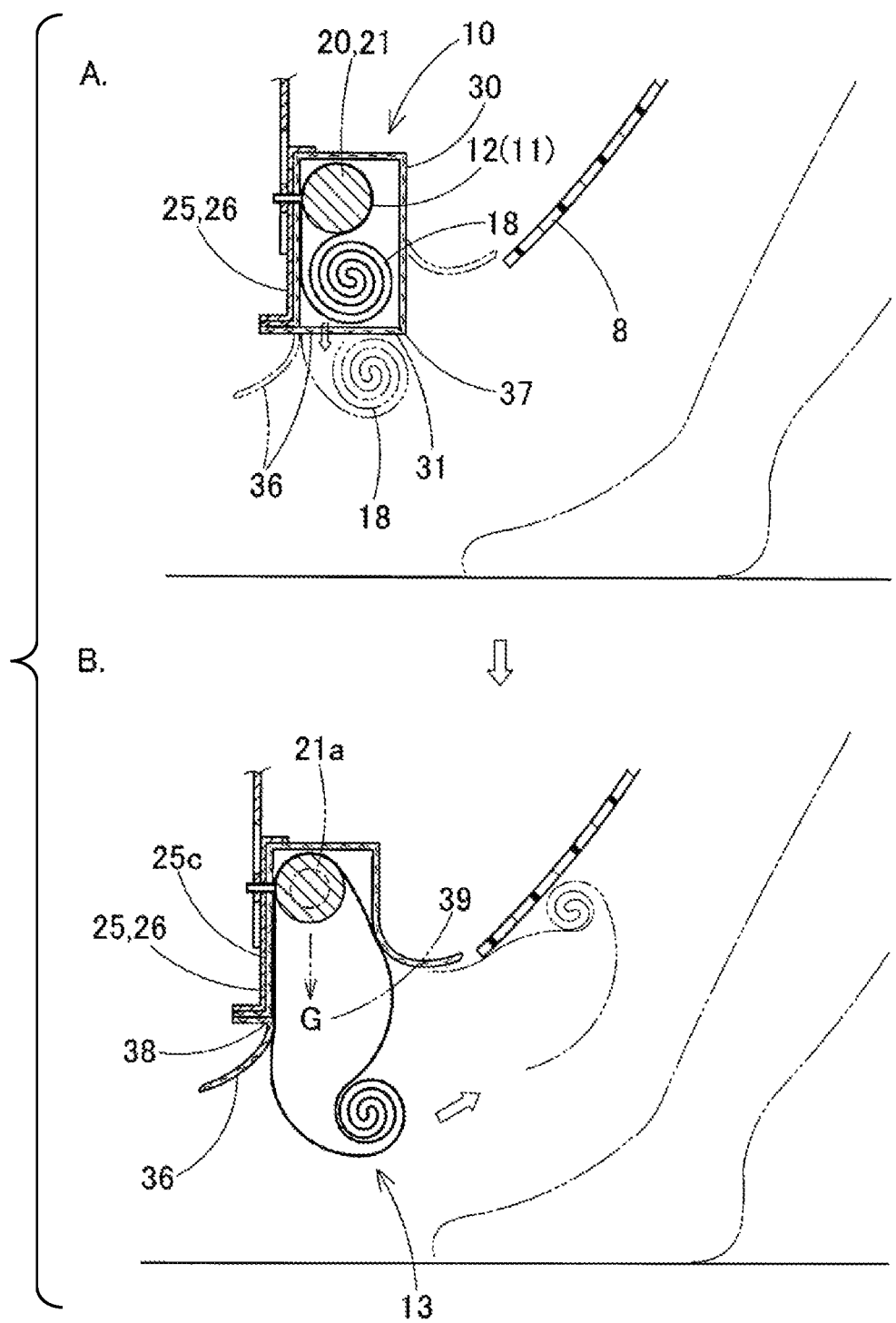
FIG. 7 is schematic vertical cross-sectional views sequentially illustrating an operating state of the knee protection airbag device of the embodiment.

After mounting the airbag device 10, when the inflator 20 operates, the inflation gas G is discharged from the gas discharge port 21a, and as illustrated at phases A, B in FIG. 7 and at phases A, B in FIG. 8, the airbag 11 is deployed and inflated, and then the scheduled breakage portion 37 of the airbag cover 30 is broken and the door portion 36 is pushed open to form the projection opening 39. After passing through the projection opening 39, the airbag 11 will be placed in front of knees K of the driver D (see FIG. 9).

In the airbag device 10 of the embodiment, using the fastening bolt 22 of the inflator 20, the inflator 20, the airbag 11, and the airbag cover 30 are attached to the holding seat 26 of the attachment base 25 to assemble the airbag device 10, and then the attachment seats 27 (L, R) of the attachment base 25 are arranged on the connection seats 2a of the bracket 2 as the vehicle body member and the attachment bolt 3 is fastened to the nut 4 while passing through the attachment seat 27 and the connection seat 2a, such that the airbag device can be mounted on the vehicle. In areas on the front, rear, left, and right sides of the mounted portion LP, unlike an area above the mounted portion LP, there are fewer various vehicle-mounted parts instead of those (steering device, air conditioning device, and the like) in the instrument panel 8 in front of the seat, and it becomes easier to secure a work space. Therefore, the mounting work can be easily carried out together with the fact that the bottom type knee protection airbag device 10 is used, which makes it easy for hands or the like to enter from a floor F side.

The folded portion 18 of the airbag 11 is arranged below the body portion 21 of the inflator 20, and during operation, the folded portion 18 is smoothly projected downward by the inflation gas G discharged from the body portion 21 (see phases A, B in FIG. 7), and thus the projection opening 39 can be formed in the airbag cover 30 by pushing the bottom surface side (bottom wall portion 31 side) of the airbag cover 30 to be opened. Therefore, during operation, the folded airbag 11 properly projects downward from the mounted portion LP, and subsequently deploys rearward and upward at the reversing portion 13. Then, as illustrated at phase A, B in FIG. 8 and in FIG. 9, the airbag 11 inflates the inflation body portion 14 to complete the inflation. Here, since the attachment base 25 is arranged to cover a portion from the base portion 12 covering the body portion 21 of the inflator 20 to the front side of the folded portion 18 in a vicinity of the base portion 12, when the airbag 11 completes inflation, from the vicinity of the base portion 12 of the airbag 11 to the reversing portion 13 of the vicinity of the base portion 12, the rear surface 25c side of the attachment base 25 supports the airbag 11 and secures a reaction force. Therefore, rotational behavior such as lowering of the inflation body portion 14 can be prevented, and the airbag 11 can accurately complete inflation while protecting the knee K.

Therefore, the knee protection airbag device 10 of the embodiment can be easily mounted on the vehicle, and can ensure that the airbag 11 being inflated properly projects downward from the mounted portion LP and subsequently deploys rearward and upward. The inflation body portion 14 of the airbag 11 at the completion of inflation can also be arranged at a precise height position.

In the knee protection airbag device 10 of the embodiment, the attachment base 25 is configured such that the arrangement positions of the fastening bolts 22 on the holding seat 26 and the arrangement positions of the attachment bolts 3 on the attachment seats 27 (L, R) correspond to each other in height over the left-right direction. In the embodiment, height positions h of the fastening bolts 22 on the holding seat 26 and the attachment bolts 3 on the attachment seats 27 (L, R) from the bottom surface 10a of the airbag device 10 correspond to arrangement positions P2 of the fastening bolts 22 and arrangement positions P1 of the attachment bolts 3. In other words, in the case of the embodiment, the arrangement positions (holding positions) P2 of the fastening holes 26a through which the fastening bolts 22 passes through the attachment base 25 and the arrangement positions P1 of the attachment holes 27a through which the attachment bolts 3 passes through the attachment base 25 correspond to the height positions h from the bottom surface 10a of the airbag device 10.

Therefore, in the embodiment, even when the inflation gas G is discharged from the body portion 21 of the inflator 20, the height positions h of the attachment position (arrangement position of the attachment hole 27a) P1 of the attachment base 25 to the bracket 2 as the vehicle body member using the attachment bolt 3 and the holding position (arrangement position of the fastening hole 26a) P2 of the body portion 21 of the inflator 20 using the fastening bolt 22 correspond to each other over the left-right direction. It is difficult for the attachment base 25 to rotate back and forth around the attachment position P1, and thus a downward projection direction and the like of the airbag 11 can be stabilized. Therefore, an expansion behavior of the airbag 11 can be further stabilized. By the way, for example, when an attachment position P3 (see the two-dot chain line in FIG. 2) of the attachment base 25 to the vehicle body member is higher than the holding position P2 of the body portion 21 of the inflator 20, with the attachment position P3 as a fulcrum, a reaction force of the inflation gas G discharged from the body portion 21 of the inflator 20 makes it easier for a vicinity of the arrangement position P2 of the fastening bolt 22 of the inflator 20 on the holding seat 26 below the attachment position P3 to rotate forward. On the other hand, when the holding seat 26 deforms to rotate forward, the reversing portion 13 of the airbag 11 and the inflation body portion 14 will shift downward, making it difficult to position the inflation body portion 14 accurately.

In the knee protection airbag device 10 of the embodiment, the attachment base 25 is made of a metal plate, and is configured to be of a substantially flat plate-shape and have reinforcing ribs 28 (U, D) which project from the upper and lower edges 25a and 25b.

Therefore, in the embodiment, even when the attachment base 25 is in the shape of a substantially flat plate, it is less likely to undergo bending deformation and can stably support the airbag 11 being inflated. Even when the attachment base 25 is made of a metal plate, the attachment base 25 can be lightened because the attachment base 25 has a substantially flat plate shape extending in the left-right direction.

In the embodiment, the folded portion 18 of the airbag 11 to be placed below the body portion 21 of the inflator 20 is formed by roll-folding such that the upper edge 14a side in a flat unfolded state approaches the base portion 12 side. However, as illustrated in FIGS. and 11, both the left and right edge portions 18b of the rolled folded portion 18 may be folded downward toward the center portion 18a in the left-right direction of the folded portion 18 to form a folded portion 18A. Even here, the folded portion 18A, that is, the center portion 18a and the edge portion 18b are provided below the body portion 21 of the inflator 20, and are mounted while being covered with an airbag cover 30A. Therefore, the airbag 11 provided with the folded portion 18A smoothly projects downward from the mounted portion LP when the inflator 20 is operated, and then flips over to unfold rearward and upward to complete inflation.

Figure 12:
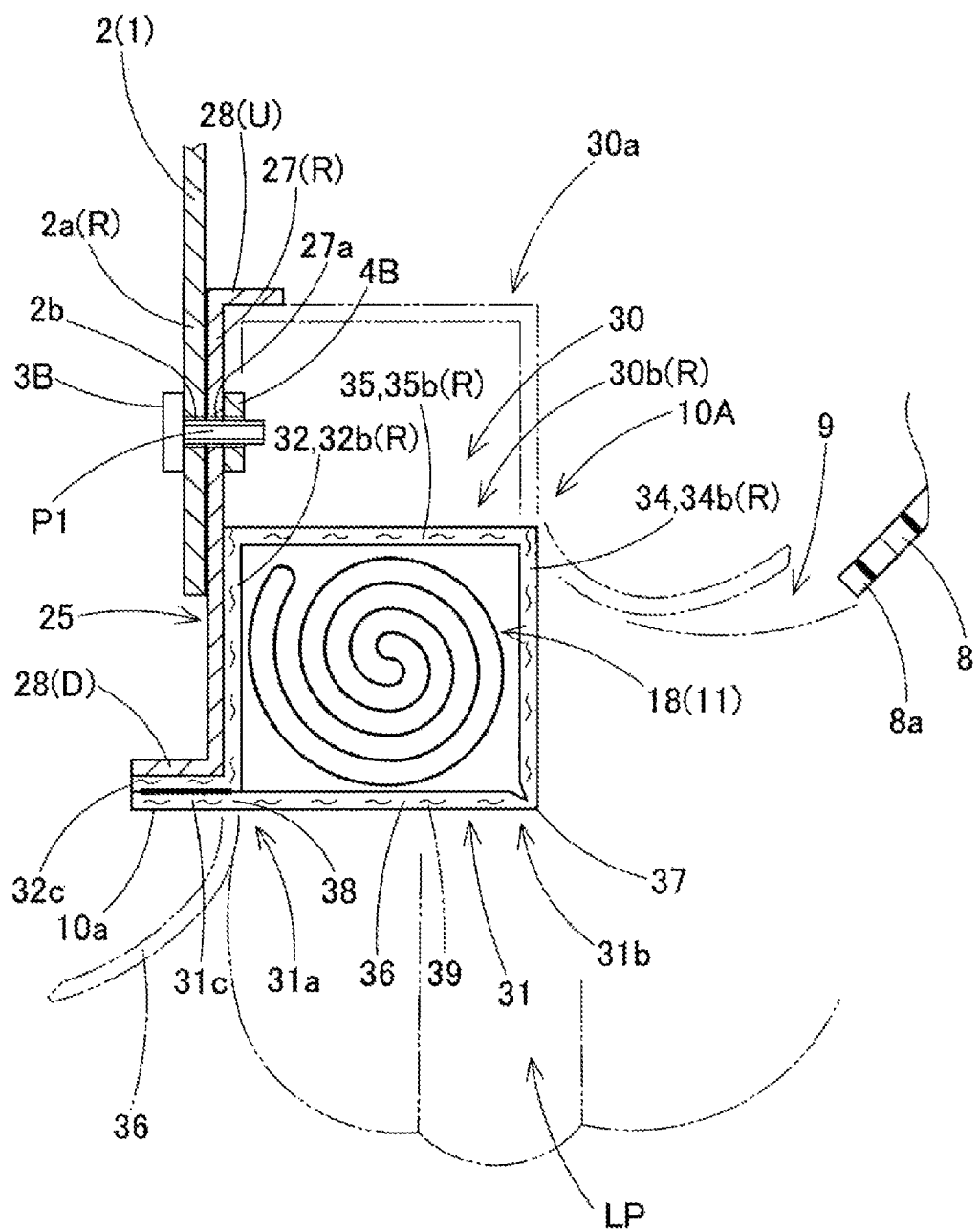
FIG. 12 is a schematic vertical cross-sectional view illustrating a modification example in which an orientation of an attachment bolt for attaching an attachment base to a vehicle body member is changed.

In the embodiment, when attaching the attachment seats 27 (L, R) of the attachment base 25 to the bracket 2 as the vehicle body member, the attachment bolt 3 that is passed from the rear to the front is used for the attachment hole 27a. However, as illustrated in FIG. 12, nuts (weld nuts) 4B may be respectively provided on front side peripheral edges of the attachment holes 27a on the attachment seats 27 (L, R) sides of the attachment base 25, and the attachment seats 27 may be attached to the bracket 2 by passing the attachment bolts 3B through the attachment holes 27a from the front and tightening the nuts 4B. Of course, although weld nuts are used as the nuts 4 in the embodiment and the nuts 4B in FIG. 12, separately, the nuts 4 and 4B may be fastened to attachment bolts 3 and 3B that are passed through attachment holes 27a and through holes 2b.

In the embodiment, the knee protection airbag device 10 mounted on the lower front side of the driver's seat is described. However, the present disclosure can be applied to a knee protection airbag device that is mounted on a lower front of seats including a front passenger seat as well as the driver's seat.

What is claimed is:

1. A knee protection airbag device comprising:
   an airbag for knee protection, which is to be folded and accommodated;
   an inflator that supplies inflation gas to the airbag;
   an airbag cover that covers the airbag which is folded and accommodated, in which the airbag cover is pushed by the airbag being inflated to form a projection opening through which the airbag projects; and
   an attachment base that holds the airbag, the inflator, and the airbag cover, and is to be attached to a vehicle body member,
   wherein the knee protection airbag device is mounted on a front lower side of a seat, and the airbag being inflated projects downward from a mounted portion of the airbag folded and subsequently deploys rearward and upward,
   the inflator includes a body portion accommodated in the airbag, and a fastening bolt projecting outside the airbag from the body portion and fastened to the attachment base,
   the airbag includes:
      a base portion that accommodates the body portion of the inflator and is attached to the attachment base together with the body portion of the inflator due to the fastening bolt being fastened;
      a reversing portion that extends downward from the base portion and reverses upward during the inflation of the airbag; and
      an inflation body portion that is inflated to expand upward from the reversing portion,
   the airbag is accommodated at the mounted portion to dispose a folded portion, which is folded such that an upper edge of the inflation body portion approaches the base portion, below the body portion of the inflator,
   the attachment base includes:
      a holding seat that is disposed in front of the body portion of the inflator and the folded portion of the airbag when mounted on a vehicle, and holds the body portion and the airbag attached by the fastening bolt being fastened; and
      attachment seats that are arranged on left and right sides of the holding seat and are attached to the vehicle body member using attachment bolts of which axial directions are parallel to a front-rear direction,
   the attachment base is configured to have a substantially flat plate shape extending in a left-right direction, and
   the airbag cover is configured to cover a vicinity of the airbag folded and the body portion of the inflator on a rear side of the attachment base, be attached to the attachment base due to the fastening bolt passing through the airbag cover, and provide the projection opening on a bottom side.

2. The knee protection airbag device according to claim 1, wherein the attachment base is configured such that an arrangement position of the fastening bolt on the holding seat and arrangement positions of the attachment bolts on the attachment seat correspond to each other in height over the left-right direction.

3. The knee protection airbag device according to claim 1, wherein the attachment base is made of a metal plate, and is configured to be of a substantially flat plate-shape and have reinforcing ribs which project from upper and lower edges.

4. The knee protection airbag device according to claim 2, wherein the attachment base is made of a metal plate, and is configured to be of a substantially flat plate-shape and have reinforcing ribs which project from upper and lower edges.

* * * * *